(12) United States Patent
Gueta et al.

(10) Patent No.: US 8,676,965 B2
(45) Date of Patent: Mar. 18, 2014

(54) TRACKING HIGH-LEVEL NETWORK TRANSACTIONS

(75) Inventors: Yaron Gueta, Hod Hasharon (IL); Shachar Ofek, Ramat-Gan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1265 days.

(21) Appl. No.: 12/512,394

(22) Filed: Jul. 30, 2009

(65) Prior Publication Data

US 2011/0029657 A1 Feb. 3, 2011

(51) Int. Cl.
*G06F 15/173* (2006.01)

(52) U.S. Cl.
USPC .......... 709/224; 709/227; 370/328; 370/508; 370/338; 370/340; 375/260; 375/340

(58) Field of Classification Search
USPC ....................................................... 709/224
See application file for complete search history.

(56) References Cited

U.S. PATENT DOCUMENTS

| | | | |
|---|---|---|---|
| 5,740,355 A | 4/1998 | Watanabe et al. | |
| 6,144,961 A | 11/2000 | de la Salle | |
| 6,477,183 B1 * | 11/2002 | Yamamoto | 370/508 |
| 6,601,149 B1 | 7/2003 | Brock et al. | |
| 6,738,933 B2 | 5/2004 | Fraenkel et al. | |
| 6,883,162 B2 | 4/2005 | Jackson et al. | |
| 7,133,805 B1 | 11/2006 | Dankenbring et al. | |
| 8,346,824 B1 * | 1/2013 | Lyle et al. | 707/822 |
| 2003/0115334 A1 | 6/2003 | Bhat et al. | |
| 2006/0018393 A1 * | 1/2006 | Gore et al. | 375/260 |
| 2007/0180085 A1 | 8/2007 | Barnett et al. | |
| 2008/0043664 A1 * | 2/2008 | Kim et al. | 370/328 |

OTHER PUBLICATIONS

Pang et al. A High-level programming Environment for packet trace anonymization and transformation, 2003, Department of Computer Science of Princeton University, pp. 1-13.*

Sen et al. Accurate, Scalable In-Network Identification of P2P Traffic Using Application Signature, 2004, AT&T Labs-Research, pp. 1-10.*

Kotsiantis, Sotiris et al., "Association Rules Mining: A Recent Overview", GESTS International Transactions on Computer Science and Engineering, vol. 32, No. 1, 2006, p. 71-82.

Ptak, Noel & Associates, "BMC: Tracking Transactions for Performance", Feb. 2006, 5 pages.

Yachin, Dan, "Business Transaction Management: Another Step in the Evolution of IT Management", IDC, 2007, 14 pages.

"Insider's Guide to HP Real-User Monitoring", Hewlett-Packard Development Company, L.P., No. 4AA1-9211ENW, Rev. 1, Nov. 2008, 8 pages.

"HP End User Management Software", Hewlett-Packard Development Company, L.P., No. 4AA1-6031ENW, Rev. 1, Jun. 2008, 4 pages.

\* cited by examiner

*Primary Examiner* — Krista Zele
*Assistant Examiner* — Arvin Eskandarnia
(74) *Attorney, Agent, or Firm* — Walter W. Karnstein

(57) ABSTRACT

A system and method of tracking high-level network transactions. At least one switching node on a network may collect low-level data packets, the low-level data packets forming collectively a corresponding stream of high-level messages as parts of high-level transactions involving network resources of the network. Identifiers of the network resources in the network serving the high-level transactions may be identified from the low-level data packets. The data content of the high-level messages may be determined. The high-level messages may be grouped into groups of high-level messages having similar data content. Commonalities in the occurrences of high-level messages having different data content may then be identified.

20 Claims, 4 Drawing Sheets

Fig. 4
DATA PATTERNS AND CORRESPONDING APPLICATIONS/SERVICES

| APPLICATION/ SERVICE | RESPONSE DATA PATTERN | REQUEST DATA PATTERN | CLASS OF DATA |
|---|---|---|---|
| CITRIX-ICA | | .........%49%43%41 | EXACT |
| LDAP | | %30.{3,6}%02 # | STATISTICAL |
| ORACLE DATABASE | %..%..%00%00%06%00 | %..%..%00%00%06%00 | STATISTICAL |
| MICROSOFT SQL SERVER | %04%0[011].{l 5}%00 | %0[113]%0[011].{l 5}%00 | STATISTICAL |
| JAVA RMI | | %4A%52%4D%49.* | EXACT |
| JAVA RMI | | %47%49%4F%50.* | EXACT |
| FTP | | (CWD\s|CDUP\s| STOR\s |RMD\s | MKD\s | | EXACT |
| FTP | | (RETR\s|USER\s| PASS\s|ACCT\s) | STATISTICAL |
| POP3 | \+OK.*POP3 | | EXACT |
| POP3 | (\+OK|\-ERR) | | STATISTICAL |
| SMTP | 220 .*SMTP | | EXACT |
| SMTP | | (HELO|DATA|MAIL FROM:|RCPT TO:|) | STATISTICAL |
| IMAP | \*\s.{0,3}(CAPABILITY \s| MAP |\d{0, 3}\s FETCH) | | EXACT |
| IMAP | \*\sLIST | | STATISTICAL |

TRACKING HIGH-LEVEL NETWORK TRANSACTIONS

BACKGROUND

The usefulness of Information technology (IT) in many business operations is well established. Correspondingly, IT operations may be dependent upon the behavior of business transactions. Customer satisfaction can result from business transactions that are successfully, reliably and quickly completed. This can result in increased revenues and lowered operating costs.

As transactions become increasing complex, it becomes more difficult to provide smooth interaction and integration of affected resources. Business transaction management (BTM) is an area of IT that includes monitoring and analyzing computerized business transactions, network intrusion detection, and network management. This can involve tracing transactions through the sometimes complex network structure and monitoring the flow of messages between network components.

When a data agent is installed on each component in an area of a network to be monitored, the performance of the application monitored may be compromised. This approach also may involve installation of such data agents on a large number of components for tracing transactions involving those components. Where performance is degraded in a monitored application, the data agent may contribute to that degradation. Further, when there is an upgrade or change in the data agents, the applications being monitored are restarted.

BRIEF DESCRIPTION OF THE DRAWINGS

Features and advantages of examples of systems, methods and devices will become apparent by reference to the following detailed description and drawings.

FIG. 4 is a table listing examples of data patterns and corresponding applications or services.

DETAILED DESCRIPTION

Methods and systems may determine a business transaction path that does not involve data agents associated with applications running on or using network resources, such as computers and/or databases. This may be accomplished, for example, by analyzing message content in a network involving communication with a network protocol, such as transmission control protocol/internet protocol (TCP/IP), a protocol widely used to communicate over networks.

Figure 1:
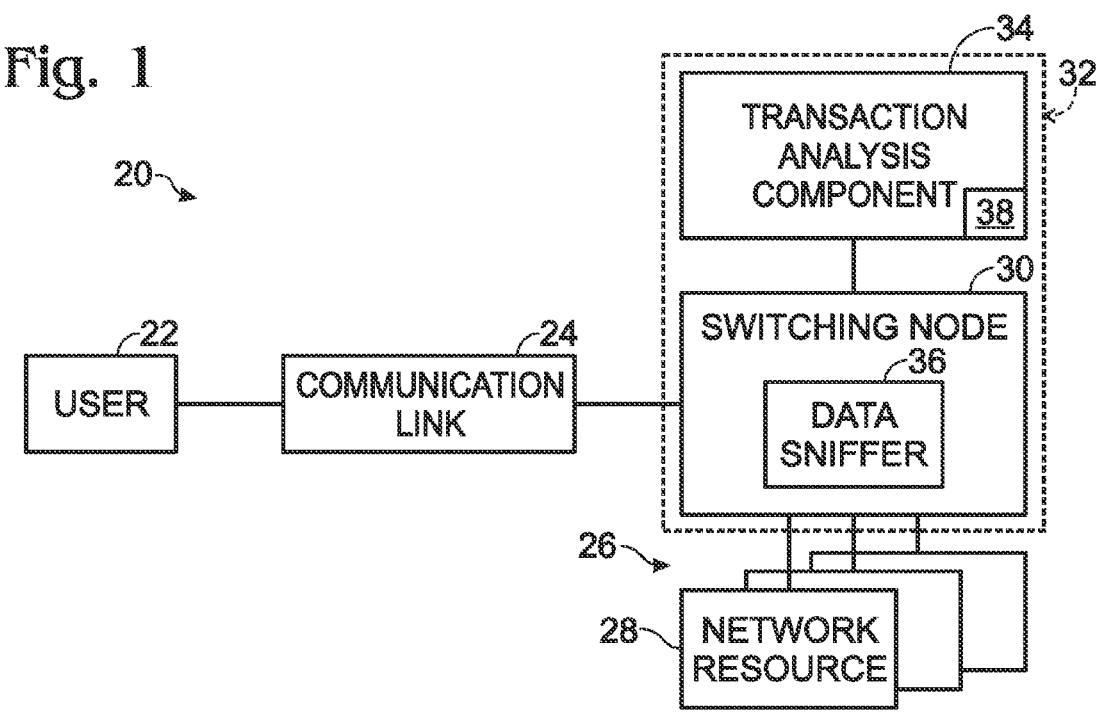
FIG. 1 is a block diagram depicting an example of a network.

Referring now to the drawings and more particularly to FIG. 1, there is illustrated a network 20. Network 20 may include a user computer 22 connected via a communication link 24 to one or more network resources 26, such as a network resource 28. A network resource may by a functional resource, such as a server having a particular functionality providing a service in a transaction. A hardware component, such as a server may accordingly have more than one function, and thus provide more than one network resource. The connection to the network resources may be via a switching node 30.

Network 20 may also include a transaction-analysis system 32 configured to provide one or more functions related to transaction tracing. Transaction-analysis system 32 may include a transaction-analysis component 34 in communication with one or more data sniffers 36. Data sniffers may detect network-communication information and may be located at one or more suitable locations in the network, such as on a network host device such as switching node 30, to detect such network-communication information. Transaction-analysis component 34 may receive information from the one or more data sniffers. Transaction-analysis component 34 may be resident on a computer with a processor (not separately shown) and a computer-readable storage device 38, and may be in a remote location or locations from the one or more data sniffers or may be resident on the same device as one or more data sniffers.

Software applications for performing functions or actions associated with detecting transactions, including operation of transaction-analysis system 32, including transaction-analysis component 34 and the one or more data sniffers 36, as well as data, may be stored on one or more storage devices 38.

The computers and other smart devices, such as switching node 30, in network 20 may each be any suitable conventional computer that includes a processor, memory or storage devices, and network devices, and if appropriate one or more input/output (I/O) devices. The storage devices, represented by storage device 38, may be any appropriate computer-readable medium or device readable by one or more computers.

A storage device 38 may hold information, process information, or both. An example of a storage device that only holds information may be a recording medium. Devices that process information (data storage equipment or media drives) may access either a separate portable (removable) recording medium or a permanent component to store and retrieve information. The storage device may store data and may have embodied therein programs of computer-readable instructions that may be executed by the one or more computers, and may include data. The storage device may be volatile or non-volatile, fixed or removable, and may include, for example, one or a combination of the following storage devices: a read-only memory (ROM), a random access memory (RAM), a hard drive, a magnetic tape and/or tape drive, a floppy disk and/or floppy-disk drive, an optical disk such as a compact disk and/or optical-disk drive, or a flash memory. Storage devices also may be local to each computer and may also be provided through network 16, such as through a remote database and/or database server, as is well known in the art.

Figure 2:
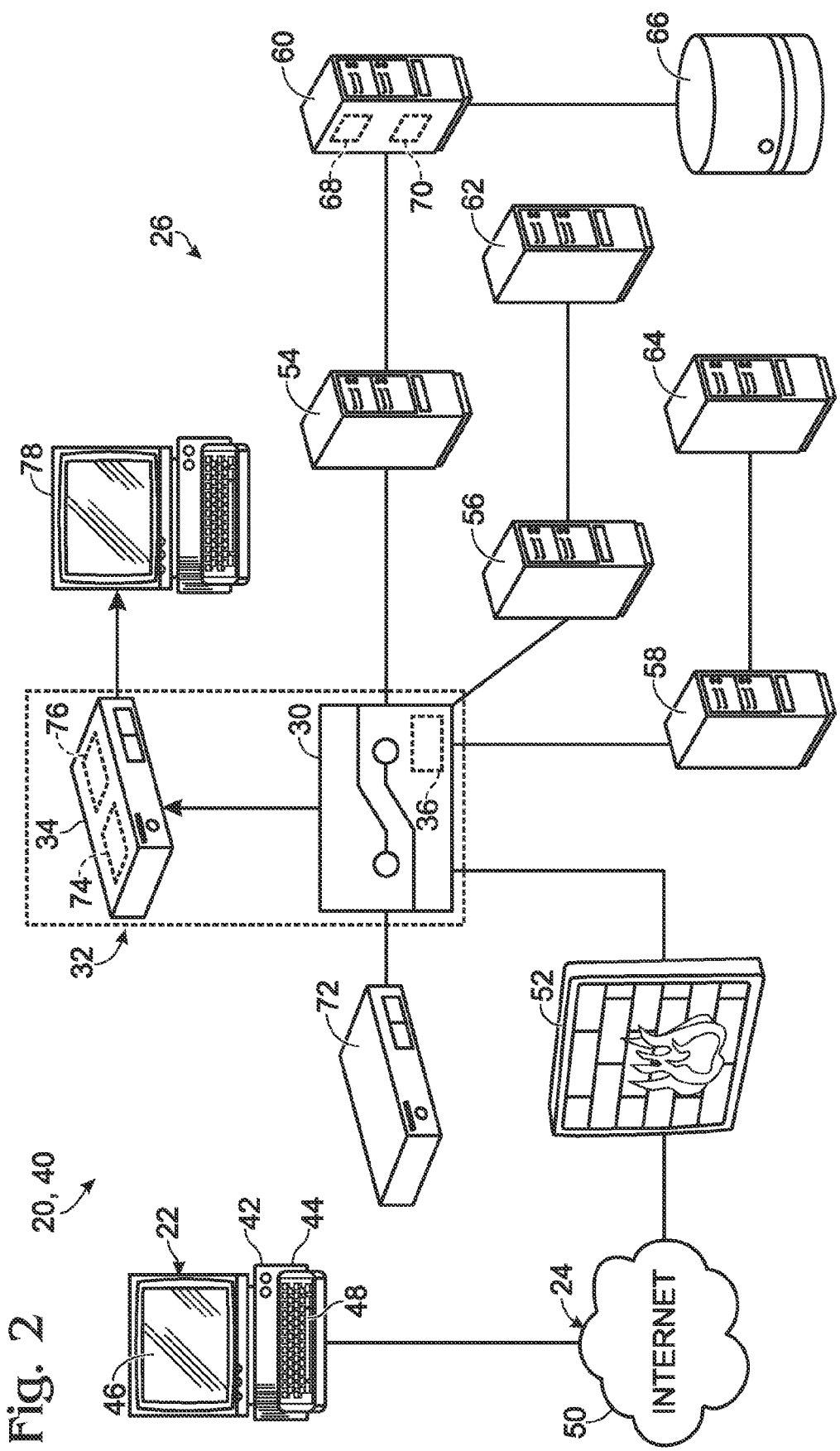
FIG. 2 is a block diagram also depicting an example of a network.

A more detailed example of a network 20 is illustrated as a network 40 in FIG. 2. Network 40 may include a user computer 22 having a processor 42 and storage device 44, and input/output devices such as a monitor 46 and a keyboard 48. Communication link 24 may be a wide-area-network, such as the Internet 50. User computer 22 may be connected to network resources 26 through Internet 50, a firewall 52, and a switching node 30.

Network resources may include, for example, a plurality of Web servers, application servers, databases, and database servers, as appropriate for the particular transactions. This example illustrates Web servers 54, 56, 58, each connected to switching node 30, as well as to respective application servers 60, 62, 64. Application server 60 is shown further connected to a mainframe database 66. Each server may be a computer having a processor 68 and various storage devices 70, as illustrated for application server 60. A load balancer 72, connected to the switching node may distribute the load among the servers.

As with network 20, network 40 may include a transaction-analysis system 32 configured to provide one or more functions related to transaction tracing. Transaction-analysis system 32 may include a transaction-analysis component 34 in communication with a data sniffer 36 resident in switching unit 30. Transaction-analysis component 32 is shown in this example as a separate computer having a processor 74 and appropriate storage devices 76. Transaction-analysis component 34 may output generated information to a business-information application unit 78 that may perform further analysis and reporting of the information in conjunction with business information obtained from other sources. Data sniffers may detect network-communication information and may be located at one or more suitable locations in the network to detect such network-communication information, such as switching node 30. Transaction-analysis component 34 may receive information from the one or more data sniffers.

An operation initiated by an end user may be referred to as a "transaction". For example, a transaction may be a request made by a user from his or her browser software on a user computer 22 that is submitted to a network resource 26, such as a Web server. The network resources used in a given example may depend on the functions of the network resources, the configuration of the network, and the operation requested. A Web server may make further requests by sending messages to another network resource, such as a backend database and/or application server. These servers in turn may also make requests to other servers, computers, storage devices, or other network resources having functions used in a transaction.

A given transaction may be implemented by messages of a common type associated with the given transaction, and there may be a common transaction path for the given transaction. For instance, when a user requests a book search, a Web server may make two calls to a database, one to look for the book according the information the user provided, and another one to determine if the book is in stock. If the user does something else like buying a book, it may cause other things to happen, such as performing a financial transaction.

Each transaction thus may be composed of a series of messages communicated between network resources, and each message may be transmitted as a series of data packets. Each data packet may have various levels of information in it, and each level may have corresponding header information, such as information identifying the source and destination of the data packet, time of transmission and receipt, and other logistical information, as well as data. The low-level information may relate to network communications and high-level information may relate to applications performing a user transaction and middleware running on the network resources.

Several steps may be involved in determining transaction paths from the messages communicated on the network. This may include discovering the network resources, such as physical servers and middleware that are running on those servers. The network communications may be analyzed to provide information on the content of the messages. Identified transactions may then be grouped or classified according to determined types of transactions. Identifiers from the classified transactions may be analyzed to identify commonalities between transaction paths. A business transaction may be formed of a plurality of transactions of different types. Such a process may be considered agentless transaction tracing in the sense that it may be based on a data sniffing solution as the data collector separate from the business applications involved in the transactions.

Figure 3:
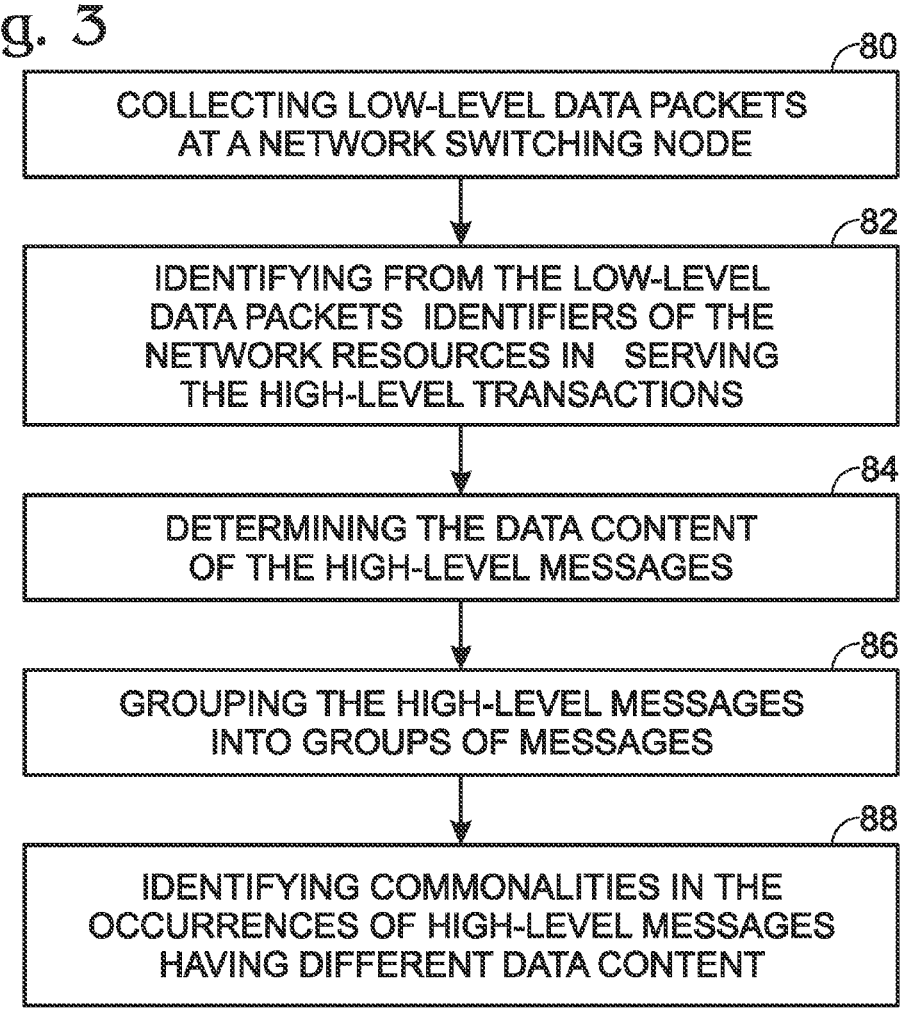
FIG. 3 is a flow chart of an example of a method of tracking network transactions.

An example of obtaining transaction paths used in a network may thus include collecting data packets on the network, identifying from the data packets network resources serving a business transaction, grouping the messages according to content of the messages, and identifying network resources for each groups of messages. As illustrated in FIG. 3, a further example may more specifically include collecting at at least one switching node on a network low-level data packets, as represented by step 80. The low-level data packets may form collectively a corresponding stream of high-level messages as parts of high-level transactions involving network resources of the network. As shown at step 82, the method may include identifying from the low-level data packets identifiers of the network resources in the network serving the high-level transactions. At step 84, the data content of the high-level messages may be determined. High-level messages may then be grouped into groups of messages having similar data content, as represented by step 86. In step 88, then, commonalities in the occurrences of high-level messages having different data content may be identified.

More specifically and as mentioned, data sniffer 36 may be connected to network switching node 30 to provide network communication information by using port mirroring, a technique also used in the proprietary system known as Real User Monitor provided by Hewlett-Packard Corporation, the assignee of the present application. The data sniffer may receive business-application traffic in TCP/IP packet format and reconstruct the application data from it. This technology may be non-intrusive by not affecting the function of the monitored applications.

Data sniffer 36 may read information of network communication packets from both the header portion and the data portion of the communication packets. This information may identify from what computing device the communication packet originated, and may contain data patterns that can be used to discover network traffic. To discover network traffic, as that term is used herein, may be to associate a specific application or service with a specific source computing device.

For example, the middleware running on network servers may be recognized by identifying a given protocol used in the messages. Each protocol may have a distinguishing pattern. The network conversation may be evaluated to identify a pattern that is contained in a predefined dictionary of known patterns.

By looking at the content of these communication packets from network traffic, data patterns may be located that are repeated across multiple communication transactions for that application or service. Data patterns may be specific character patterns, hexadecimal patterns, binary patterns or the like contained within communication packets of a transaction. Data patterns that appear in higher percentages of communication packets or transactions for a particular application or service may be used for discovering network traffic. In addition, data patterns for identifying a particular application or service may be chosen such that they do not appear as often in other applications or services of interest.

Different classes of data patterns may be utilized. A first class of data patterns may be data patterns that are deemed to be unique to a specific application or service. For this class of data patterns, a communication packet or transaction may be associated with a specific application or service if a single communication packet or transaction contains the data pattern. This class of data patterns may be referred to as exact data patterns. Exact data patterns may be those data patterns that have a high likelihood of occurring during a communication transaction of the specific application or service, and a low likelihood of occurring during a communication transaction of other applications or services of interest. Other applications or services might generate such a data pattern within their communication transactions, but that the probability may be low enough that an error in identification is considered acceptable.

A second class of data patterns may be data patterns that identify a specific application or service if they were to occur in a predefined and configurable threshold number of communication packets or transactions between two computing devices. When more than the threshold number of conversions is identified, the specific connection identified may be assigned. Unlike exact data patterns, the threshold number may be greater than one. This class of data patterns may be called statistical data patterns. Statistical data patterns may be those data patterns that have a relatively high likelihood of occurring during a communication transaction of the specific application or service, and a relatively low likelihood of occurring during a communication transaction of other applications or services of interest.

The probability associated with an exact data pattern occurring in a communication transaction of its corresponding application or service may be higher than the probability associated with a statistical data pattern occurring in a communication transaction of its corresponding application or service. By observing known communication transactions from applications or services of interest, an observer may generate the statistical probability that a given data pattern of a single communication transaction correctly identifies its corresponding application or service, or the statistical probability that a given data pattern occurring in a threshold number of communication transactions in a particular sample of communication transactions correctly identifies the corresponding application or service. The particular sample of communication transactions may be based on time, e.g., those communication transactions occurring in 10 seconds, or the particular sample of communication transactions may be simply a defined number of analyzed communication transactions.

The TCP/IP conversations may be analyzed in order to determine the content of the messages. The identified content of the TCP transactions may be analyzed using text-based algorithms associated with each selected known protocol involved in a common business transaction (such as database protocols, LDAP, and RMI). These analyzers may convert a binary TCP transaction into a sentence.

Many textual protocols may resemble a command shell or command console. The patterns may be specified as regular expressions that may be matched against the data in the data packets when interpreted as ASCII characters. These resemblances may be used to parse known protocols. The parser may configure via a configuration file that describes a shell-like environment such as commands, parameters, and command output format. A shell program may provide direct communication between the transaction-analysis system, in this case, and an operating system. Different configuration files may be used to parse many textual shell-like protocols without writing new code, which then may need to be compiled and executed.

The table shown in FIG. 4 lists examples of data patterns and corresponding applications or services. These examples include exact and statistical data patterns. As is shown in the examples in the table, the same application or service might be discovered using more than one class of data pattern. For example, the data pattern "220.*SMTP" occurring in the response communication packet is deemed to be an exact data pattern for discovery of the SMTP service, while the data pattern "(HELO|DATA|MAIL FROM:|RCPT TO:|)" occurring in the request communication packet is deemed to be a statistical data pattern for discovery of the SMTP service. A statistical data pattern for an application or service may be deemed an exact data pattern if received on a specific port. The analysis may be similar to the examples above that are not port-specific, i.e., by observing known communication transactions from applications or services of interest, the statistical probability may be generated that a given data pattern of a single communication transaction received at a specific port would correctly identify its corresponding application or service. For example, the statistical data pattern for discovery of the FTP service may be deemed to be an exact data pattern if the request communication packet is received at port 21, the statistical data pattern for discovery of the POP3 service may be deemed to be an exact data pattern if the response communication packet is received at port 110, the statistical data pattern for discovery of the SMTP service may be deemed to be an exact data pattern if the request communication packet is received at port 25, and the statistical data pattern for discovery of the IMAP service may be deemed to be an exact data pattern if the response communication packet is received at port 143.

Not all applications or services occurring on a network need be analyzed for exact or statistical data patterns, i.e., it is not necessary to define a correspondence between each application or service that may occur on a network and one or more exact and/or statistical data patterns. If communication packets of a particular source computing device fail to match any data pattern of the plurality of defined data patterns being compared during a particular sample of communication transactions, an application or service could may be assigned to communication transactions originating at that specific source computing device based upon what port is being used for those communication transactions. Furthermore, additional embodiments may ignore low-usage items, e.g., if a number of communication transactions is below some threshold level, or if a number of recipient computing devices is below some threshold level, that traffic may be ignored as insignificant.

Figure 5:
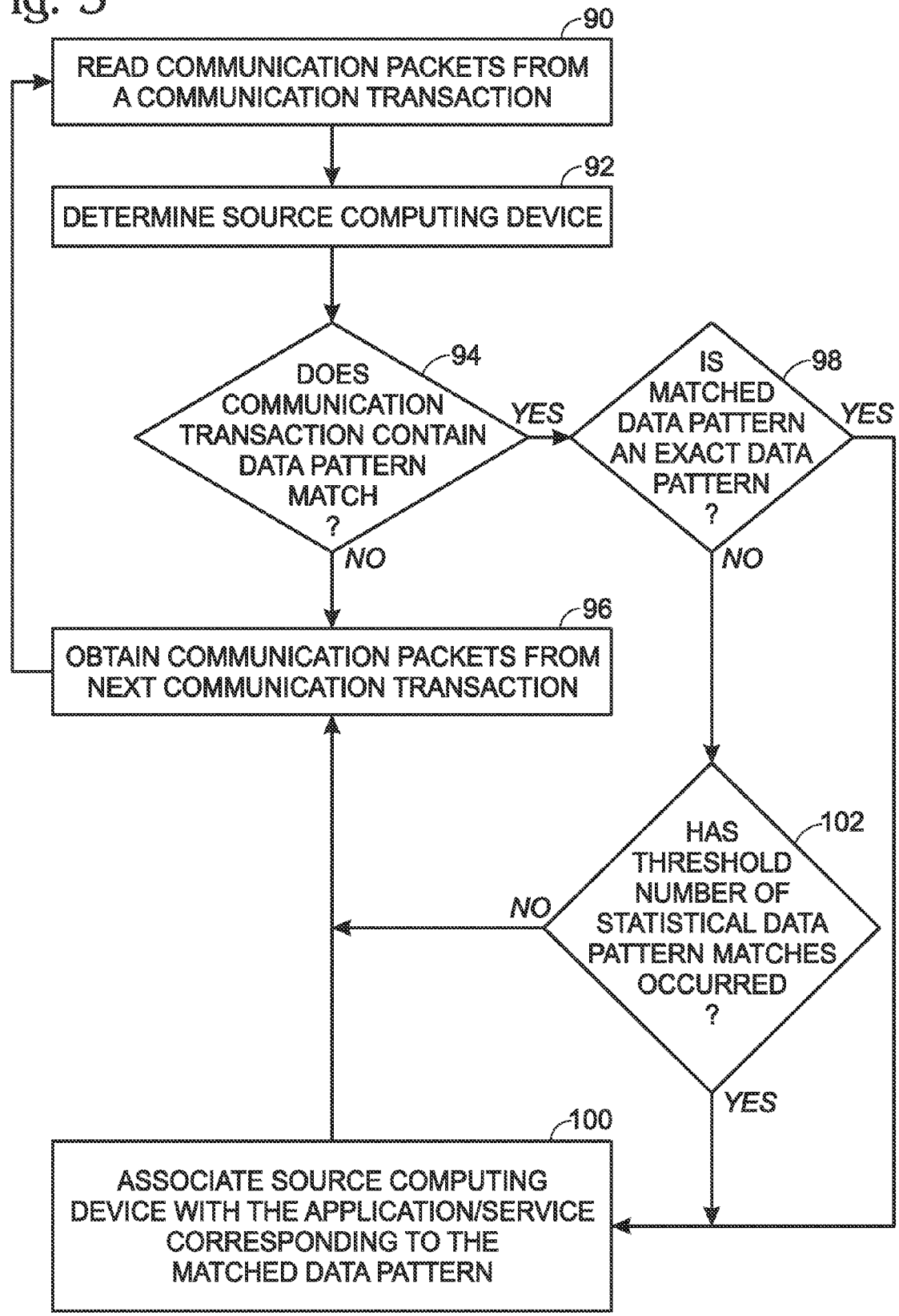
FIG. 5 is a flow chart of an example of a method of discovering network traffic.

FIG. 5 is a flow chart of an example of a method of discovering network traffic. At step 90, communication packets are read, such as through the use of a data sniffer, and compared to a defined plurality of data patterns. At step 92, these communication packets are analyzed to determine a source computing device and to determine whether a communication packet contains a match for one of the defined data patterns. Determining the source computing device may include reading the source address contained in the header portion of a request communication packet of the communication transaction.

At step 94, a determination is made as to whether the communication transaction contains a data pattern match. This may be accomplished by comparing a plurality of defined data patterns to the content of the request communication packet and/or the response communication packet of the communication transaction.

The process proceeds to step 96 if no data pattern match is contained in the communication transaction to obtain communication packets from a next communication transaction. If a data pattern match is contained in the communication transaction as determined at step 94, a determination is made at step 98 as to whether the matched data pattern is an exact data pattern. If the matched data pattern is determined to be an exact data pattern at step 98, the source computing device is deemed to be running the application or service corresponding to the matched exact data pattern, and the source computing device is associated at step 100 with that corresponding application or service. If a match is found for a defined data pattern that is an exact data pattern, the source computing device is identified to be running the application or service associated with that exact data pattern.

If a match is found for a defined data pattern that is a statistical data pattern, the source computing device is identified to be running the application or service associated with that statistical data pattern if some threshold number of communication transactions match that statistical data pattern for that source computing device of some particular sample of communication transactions. For example, if 5 or more communication transactions from the source computing device match the statistical data pattern for those communication transactions occurring over a 10-second period, the source computing device could be identified to be running the application or service associated with that statistical data pattern.

If the matched data pattern is determined at step 98 not to be an exact data pattern, i.e., it is a statistical data pattern, the process proceeds to step 102 to determine whether a threshold number of statistical data pattern matches has occurred. If it is determined at step 102 that a threshold number of statistical data pattern matches has not occurred, the process proceeds to step 96 to obtain communication packets from a next communication transaction. If a threshold number of statistical data pattern matches has occurred as determined at step 102, the source computing device is deemed to be running the application or service corresponding to the matched statistical data pattern, and the source computing device is associated at step 100 with that corresponding application or service.

The results may be reported as a graph that identifies the messages being communicated on the network, by type of message, that are communicated during execution of a transaction initiated by the user. For example, a transaction can cause a service to be called, and this service may call another service. The graph then may describe the sequence of messages, i.e., which message triggered which subsequent message. This technique thus may find frequently used or common occurrences of messages of the same type.

A sequential text clustering algorithm may be used for creating a dictionary of message types. Similar conversations may be classified as one type even though they are not identical. Each TCP transaction in the network traffic may be mapped to a message type, based on similarity of message templates as well as variable message fields. Processing the TCP conversations sequentially may improve efficiency of operation, particularly when there are a large number of TCP conversations.

This function may be provided by clustering messages according to the message text. Each message may be assigned to an existing cluster based on text similarity. Thus, different transactions may be assigned to one type even in cases where those transactions are not identical. A message may be assigned to a new cluster if the message is not sufficiently similar to any existing cluster. Additionally, clusters may be split to create a tree, based on word statistics. The result may be a forest of message type trees. Each leaf may represent a message type, and each cluster of messages may include similar messages.

The similarity of words in a message may be measured to provide a score that may indicate the similarity between two words. Each cluster of words may imply a message type. A word may be compared to all the existing clusters using the distance function. A score may be produced that indicates how well the word matches the words in a given cluster. The word may be assigned to a cluster for which the score indicates the similarity is the highest. The score of the distance function also may be compared to a configurable threshold. If the result exceeds the threshold the words may be considered similar enough. If no existing cluster produces a score that exceeds the configurable threshold a new cluster may be created and the word may be assigned to it. The type of the word is considered an identifier of the cluster it is assigned to.

To create the dictionary, the text messages may be mapped to a smaller set of message clusters taking advantage of characteristics of the messages. For example, messages produced by the same template may be identical in many of the words, with differences only at various parameters. Additionally, similarity may include similarity in the order of words in messages. The following order-sensitive cosine similarity function may be used to identify similarity between the messages:

$$<\mathrm{msg1, msg2}>=n12/(\mathrm{sqrt}(n1 \cdot n2)), \quad \text{(Eq. 1)}$$

where n12 is the number of identical words comparing each word position of msg1 and msg2, and n1 and n2 are the number of words in each message.

The message clusters may comply with set rules. The following rules are examples of rules that may be applied.

1. Two messages that belong to the same cluster at time t, cannot belong to conflicting clusters at time t+1, to avoid producing conflicting conclusions depending on t. A forest of cluster trees may be built using this algorithm, ensuring that messages may always be a part of the same tree in the forest, thus maintaining global consistency.

2. Similar messages with different semantics or frequent parameter values may be put in separate clusters. This may allow for the occurrence of messages that are almost identical, but for which the semantics may be very different. For example, the message "network is up" versus the message "network is down" are the same with the only difference being the words "up" and "down". As a further example, the message "login user $name" may have instances where $name="root" and the rest of the message has varying names, suggesting that user "root" may be considered separately from the other messages. In such cases, clusters may be split based on the entropy of word positions in the messages and the words within each position, thereby maintaining high entropy among the members of a cluster in the word positions considered parameters.

As an example, in a scenario in which the user is searching for a book by its author in an online bookstore. The server in the backend may call a database and look for books having an author the user specified. Requests to the database that are made as a result of search requests by different users may be similar but not necessarily identical. For example, the name of the author may be different. The same type may be assigned to messages that perform the same operation, and differ only in the arguments. In the above example, the type may be 'look for a book by its authors' and the actual author may be ignored. Types may be an alphanumeric code, such as simply an assigned number.

As a further example, If a database is queried with a command "select*from users where user='Tom'" the same type of query may be used by different SQL statements with a replacement of the "user" value. All of these statements may be considered to be of the same type. Another example of a type may be a session identifier in a HTTP request. Many users may perform the same login to an application using different session identifiers, but yet all these logins can be considered as the same type, where the type is 'login'. The result of this classification process may be a set of type identifiers, where each type identifier represents a group of similar TCP transactions.

The dictionary creation algorithm may begin with an empty set of clusters. Each new message may be compared to a representative message of the existing clusters in the order in which the clusters were created, and may be assigned to the first cluster to which a similarity threshold is exceeded. This may ensure the satisfaction of the consistency requirement. When a message is clustered into a node with children, the similarity of the message with each one of the children may also be considered. If the similarity threshold is not surpassed for any of the existing clusters, a new cluster may be created and the message may be used as the representative message of the new cluster.

A second step of the algorithm may consider splitting a cluster under certain circumstances. For example, a cluster may be split if the following conditions are met:

1. There are a minimum number of messages that belonged to the cluster; and
2. A word position has an entropy smaller than a splitting threshold (but not zero) and at least one word in that word position appears in x % of the messages. The entropy h(j) of a word position may be computed as:

$$h(j) = -\sum_{k=1}^{n} (p_{kj} \cdot \log(p_{kj})),$$

where n is the number of words in the dictionary, $p_{kj}$ is the probability that word k appears in position j, computed as $p_{kj}=n_{kj}/n_c$, where $n_{kj}$ is the number of times word k appeared in position j, and $n_c$ is the number of messages belonging to the cluster.

When the two conditions are met, a cluster may be split into at least two clusters, and possibly more if there are more words that pass the x % threshold. For example, x may equal 10 and the minimum number of messages in a cluster may be 1000. Other threshold values may be used as is appropriate for a particular application.

The output of the algorithm may be a forest of cluster trees, in which the branches of the tree may represent splits based on the entropy criterion, and the tree roots may be based on the cosine similarity criterion. The algorithm may be performed in a single pass over the data, preserving word counts for splits as it reads the messages. Creating the root of the forest may be done in this single pass, while the splitting phase may be performed periodically on select clusters such that new messages are not held up for long.

With clusters of messages by message types established, a common transaction path may then be determined. The messages may be grouped into clusters of common types, such that each message is assigned a type. Common patterns may then be identified in the stream of messages. Data related to the types of the messages may be collected, such as the source, the destination, the start timestamp, and/or the end timestamp. Such data may be used to determine whether a message is likely to be caused by another message.

The messages may be processed in the order of their occurrences. For every processed message, other messages that may be candidates to cause the message being processed may be determined. For example, a message M1 may be a candidate to cause message M2. A candidate may be determined based on selected criteria, such as if the destination of message M1 is the same as the source of message M2, the start time of message M1 is equal to or less than the start time of message M2, and the end time of message M1 is equal to or greater than the end time of message M2.

A table of counters may be used to track the number of occurrences of different message types. A further table of counters may be used to track relationships between message types. For example, for every pair of message types T1 and T2, the number of occurrences of a message of type T2 may be tracked that had a candidate message that may cause a message of type T1. Further, the number of occurrences of messages of type T1 that were candidates to cause a message of type T2 may be tracked.

For each pair of message types T1 and T2, the percentage of occurrences of T1 out of the total occurrences of T1 for which it was a candidate to cause T2 may be determined. The percentage of occurrences of messages of type T2 out of the total number of occurrences of messages of type T2 that it was a candidate to be caused by message of type T1 may also be determined.

The resulting percentages may be compared against predefined thresholds. For the pairs of messages of type T1 and T2 that one or both of the percentages exceed the associated thresholds, a message of type T1 may be considered to cause a message of type T2. When all the pairs of message types in which a message of type TX causes a message of type TY to occur, a tree structure may be determined that define the particular transaction path. This may be accomplished by first identifying the types that are caused by the initial front end transaction type, and then identifying the types that are caused, and repeating this process for each sequential message type until the end of the transaction is reached.

This procedure may be extended to establish a table of triplets rather than pairs. That is, for a set of messages of types T1, T2, and T3, the number of occurrences of messages of type T3 may be identified in which the message of type T3 may be a candidate causing a message of type T2 that in turn may be a candidate causing a message of type T1. Other series or chains of messages, such as quadruplets, quintets, et cetera, may be determined.

The linked or associated types of messages may be used to identify a common set of message types and associated servers, i.e., a common transaction path that may serve the business transaction. The common path for a transaction type thus may be a set of servers and middleware on the servers serving the transaction. Accordingly, such a process may provide a full path for each business transaction served by the network. In addition to getting the full transaction path, each step in an identified transaction may be monitored to provide management information relating to the performance of the network, such as network resources that may be unavailable or cause a delay in a transaction.

It is seen that an installation of the transaction-analysis system may exist in a centralized place as it is not necessary to install an agent at each network resource. Installation may be provided without knowing the backend systems and may not require substantial technical knowledge. The business transaction paths may be discovered and the transactions may be monitored without configuring or preliminary knowledge of the backend environment being monitored. It may be sufficient to install a data sniffer on one server that is connected to a network switching node. Such installation also does not require restarting the network resources serving the business transactions.2. Non-intrusive, zero overhead on the monitored application.

Once the business transactions are traced, performance analysis may be performed. Such information may be beneficial to the network owner. Performance of the system may also be determined from information in the messages, such as by example, showing that the transaction of buying a book may take 10 seconds, 7 seconds of which are accessing the database information. There are other usages for this info. For instance, the data can be used to ease the process of installing other more intrusive tools that require installing a sensor component on the servers of interest. The information provided by a transaction-analysis system 32 may help a user decide where additional sensor components may be installed.

In conclusion, it will be appreciated then that the foregoing discloses a system and a method of tracking high-level network transactions performed by a transaction-tracking system comprising collecting at at least one switching node on a network low-level data packets, the low-level data packets forming collectively a corresponding stream of high-level messages as parts of high-level transactions involving network resources of the network; identifying from the low-level data packets identifiers of the network resources in the network serving the high-level transactions; determining the data content of the high-level messages; grouping the high-level messages into groups of messages having similar data content; and identifying commonalities in the occurrences of high-level messages having different data content.

Identifying resources may include comparing data in the collected low-level data packets to data patterns in a library of data patterns of network resources; and assigning each low-level data packet to one of the potential given network resources to which the data pattern of the low-level data packet is similar. Identifying resources may further include constructing high-level messages from the low-level data packets assigned to the same network resource.

Grouping the high-level messages into groups may include assigning a high-level message type to each group of the high-level messages having similar data content. A high-level message that is of a given high-level message type may have a corresponding message attribute, and wherein grouping the high-level messages into groups of high-level messages having the same high-level message type includes mapping each high-level message to a given high-level message type when the high-level message has a message attribute that is similar to the corresponding message attribute of the given high-level message type. The message attribute may include a message template, variable message fields, or both message template and variable message fields.

As a further example, identifying a series of network resources for each group of messages may include identifying a common sequence of high-level message types in high-level transactions, and assigning the identified common sequence of high-level message types as the transaction flow through the network for an associated high-level transaction.

As yet a further example, a computer-readable storage device readable by one or more computers and having embodied therein a program of computer-readable instructions that, when executed by the one or more computers, may provide for performing such a method.

Where the following claims recite "a" or "a first" element or the equivalent thereof, such claims should be understood to include one or more such elements, neither requiring nor excluding two or more such elements.

What is claimed is:

1. A method of tracking high-level network transactions performed by a transaction-tracking system comprising:
    collecting at at least one switching node on a network low-level data packets, the low-level data packets forming collectively a corresponding stream of high-level messages as parts of high-level transactions involving network resources of the network;
    identifying from the low-level data packets identifiers of the network resources in the network serving the high-level transactions;
    determining a data content of the high-level messages;
    grouping the high-level messages into groups of high-level messages having similar data content; and
    identifying commonalities in the occurrences of high-level messages having different data content.

2. The method of claim 1, wherein identifying resources includes
    comparing data in the collected low-level data packets to data patterns in a library of data patterns of network resources; and
    assigning each low-level data packet to one of the potential given network resources to which the data pattern of the low-level data packet is similar.

3. The method of claim 2, wherein identifying resources further includes constructing high-level messages from the low-level data packets assigned to the same network resource.

4. The method of claim 1. wherein grouping the high-level messages into groups includes assigning a high-level message type to each group of the high-level messages having similar data content.

5. The method of claim 4, where a high-level message that is of a given message type has a corresponding message attribute, and wherein grouping the high-level messages into groups includes mapping each high-level message to a given high-level message type when the high-level message has a high-level message attribute that is similar to the corresponding high-level message attribute of the given high-level message type.

6. The method of claim 5, wherein the high-level message attribute includes a message template, variable message fields, or both message template and variable message fields.

7. The method of claim 1, wherein identifying a series of network resources for each group of high-level messages includes identifying a common sequence of high-level message types in high-level transactions, and assigning the identified common sequence of high-level message types as the transaction flow through the network for an associated high-level transaction.

8. A system for tracking high-level network transactions, the system comprising:
    a processing resource in communication with a memory resource, wherein the memory resource includes a set of instructions and wherein the processing resource is designed to carry out the set of instructions;
    at least one data sniffer to collect at a switching node of a network low-level data packets, the low-level data packets forming collectively a corresponding stream of high-level messages as parts of high-level transactions involving network resources of the network; and
    a transaction-analysis component to communicate with the at least one data sniffer;
    the transaction-analysis component and the at least one data sniffer to:
        identify from the low-level data packets identifiers of the network resources serving the high-level transactions;
        determine a data content of the high-level messages;
        group the high-level messages into groups of high-level messages having similar data content; and
        identify commonalities in the occurrences of high-level messages having different data content.

9. The system of claim 8, wherein to identify resources includes to compare data in the collected low-level data packets to data patterns in a library of data patterns of network resources; and assigning each low-level data packet to one of the potential given network resources to which the data pattern of the low-level data packet is similar.

10. The system of claim 9, wherein to identify resources further includes to construct high-level messages from the low-level data packets assigned to the same network resource.

11. The system of claim 8, wherein to group the high-level messages into groups includes to assign a high-level message type to each group of the high-level messages having similar data content.

12. The system of claim 11, where a message that is of a given message type has a corresponding message attribute, and wherein to group the high-level messages into groups of high-level messages having the same high-level message type includes to map each high-level message to a given high-level message type when the high-level message has a message attribute that is similar to the corresponding message attribute of the given high-level message type.

13. The system of claim 12, wherein the message attribute includes a message template, variable message fields, or both message template and variable message fields.

14. The system of claim 8, wherein to identify a series of network resources for each group of high-level messages includes to identify a common sequence of message types in high-level transactions, and to assign the identified common sequence of message types as the transaction flow through the network for an associated high-level transaction.

15. A non-transitory computer-readable storage device readable by one or more computers and having embodied therein a program of computer-readable instructions that, when executed by the one or more computers, provide for:
   collecting at least one switching node on a network low-level data packets, the low-level data packets forming collectively a corresponding stream of high-level messages as parts of high-level transactions involving network resources of the network;
   identifying from the low-level data packets identifiers of the network resources in the network serving the high-level transactions;
   determining a data content of the high-level messages;
   grouping the high-level messages into groups of high-level messages having similar data content; and
   identifying commonalities in the occurrences of high-level messages having different data content.

16. The non-transitory computer-readable storage device of claim 15, wherein the program of computer-readable instructions provides further for comparing data in the collected low-level data packets to data patterns in a library of data patterns of network resources; and assigning each low-level data packet to one of the potential given network resources to which the data pattern of the low-level data packet is similar.

17. The non-transitory computer-readable storage device of claim 16, wherein the program of computer-readable instructions provides further for constructing high-level messages from the low-level data packets assigned to the same network resource.

18. The non-transitory computer-readable storage device of claim 15, wherein the program of computer-readable instructions provides further for assigning a high-level message type to each group of the high-level messages having similar data content.

19. The non-transitory computer-readable storage device of claim 18, where a high-level message that is of a given high-level message type has a corresponding message attribute, and wherein the program of computer-readable instructions provides further for mapping each high-level message to a given high-level message type when the high-level message has a high-level message attribute that is similar to the corresponding message attribute of the given message type.

20. The non-transitory computer-readable storage device of claim 15, wherein the program of computer-readable instructions provides further for identifying a common message types in high-level transactions, and assigning the identified common sequence of message types as the transaction flow through the network for an associated high-level transaction.

* * * * *